United States Patent [19]

Buck

[11] E Patent Number: Re. 32,872

[45] Reissued Date of Patent: Feb. 21, 1989

[54] APPARATUS FOR DEPOSITING SHEETS IN A PILE

[75] Inventor: Hermann Buck, Huelben, Fed. Rep. of Germany

[73] Assignee: bielomatik Leuze GmbH & Co., Fed. Rep. of Germany

[21] Appl. No.: 945,252

[22] Filed: Dec. 19, 1986

Related U.S. Patent Documents

Reissue of:

[64] Patent No.: 4,569,622
Issued: Feb. 11, 1986
Appl. No.: 495,637
Filed: May 18, 1983

[30] Foreign Application Priority Data

Jun. 3, 1982 [DE] Fed. Rep. of Germany ..... 3220813

[51] Int. Cl.[4] ..... B65H 31/30

[52] U.S. Cl. ..... 414/790; 271/218; 414/788.9; 414/790.2; 414/790.8

[58] Field of Search ..... 414/35, 43, 45, 50; 271/218, 219

[56] References Cited

U.S. PATENT DOCUMENTS

| | | | |
|---|---|---|---|
| 2,424,093 | 7/1947 | Harred | 414/45 |
| 2,904,335 | 9/1959 | Rabinow | 271/219 |
| 3,054,516 | 9/1962 | Joa | 414/45 |
| 3,191,927 | 6/1965 | Hartbauer et al. | 414/45 X |
| 4,297,066 | 10/1981 | Ramcke et al. | 414/43 |
| 4,406,449 | 9/1983 | Buck | 271/218 X |
| 4,436,472 | 3/1984 | Kunzmann | 414/50 |

FOREIGN PATENT DOCUMENTS

| | | |
|---|---|---|
| 1279035 | 10/1968 | Fed. Rep. of Germany . |
| 1303445 | 4/1973 | Fed. Rep. of Germany . |
| 2547298 | 5/1977 | Fed. Rep. of Germany . |
| 2715705 | 11/1977 | Fed. Rep. of Germany . |

*Primary Examiner*—Leslie J. Paperner
*Attorney, Agent, or Firm*—Steele, Gould & Fried

[57] ABSTRACT

Overlapped sheets are conveyed against a stop to form piles, a plurality of the stops being provided on a starwheel. The leading edge of each forming pile is carried by carrier fingers operatively associated with the stops, most of the pile being carried over the actual pile table by a support element, which projects in ramp-like sloping manner through the table plane. The pile can be removed by a gripper after lowering the support element, while a new pile forms on a carrier finger swung in by rotation of the starwheel.

15 Claims, 2 Drawing Sheets

APPARATUS FOR DEPOSITING SHEETS IN A PILE

Matter enclosed in heavy brackets [ ] appears in the original patent but forms no part of this reissue specification; matter printed in italics indicates the additions made by reissue.

BACKGROUND OF THE INVENTION

The invention relates to an apparatus for depositing sheets in a pile and for removing the pile, with a carrier member for the leading edges of the sheets removable from the pile and a removal device acting under the carrier member for the pile resting on the pile table.

Such an apparatus is known from DAS No. 1,303,445 wherein, a flow of sheets fed in a ragged manner runs against a pivotable stop member on a pile or stock table. When the collecting pile has reached the necessary height, a separating shoe with an auxiliary stop is swung in over the pile and holds the leading edges of the sheets until the pile resting on the pile table has been removed. The separating shoe then swings out again and most of the pile formation takes place on the pile table.

This apparatus operates successfully, but it would be desirable to further develop it to bring about an even faster operation, while maintaining and improving the clear separation between the following piles.

German Pat. No. 1,279,035 discloses separating fingers, which are briefly introduced into a ragged flow of sheets to deflect the latter upwards and consequently bring about a gap in the said sheets. However, they lead to disordered groups of articles, which are not in a neat pile.

German Pat. No. 2,547,298 discloses a piling device, which the pile table comprises a large, sawtoothlike star wheel, on whose "teeth" the pile forms and is advanced after being produced. However, such an apparatus is too space-consuming for large sheet sizes, is difficult to adapt to different formats and requires a very definite, large gap in the ragged flow of sheets, in order to be able to advance the star wheel.

Furthermore, DOS No. 2,715,705 discloses the apparatus in which the individual sheets drop into a very deep pile shaft, in which a starwheel with long, thin arms mounted in rotary manner behind the leading edge of the pile and below the delivery conveyor, is swung into the flow of sheets and temporarily carries the sheets which have collected to form a small pile, while the completed pile is drawn downwards. However, with this apparatus, during the swinging in of the starwheel into the tight, ragged flow of sheets, one or a few sheets may not be fed up to the leading edge of the pile and are instead jammed, creased and crumpled by the swung in starwheel, because it is swung transversely and in fact with one component of motion opposite to the sheet transfer direction.

SUMMARY OF THE INVENTION

The object of the invention is to further develop an apparatus for depositing sheets in a pile for obtaining higher operating speeds, accompanied by a complete and trouble-free pile separation.

According to the invention, this object is achieved in that, a support device is provided for at least the central part of the pile, which can be raised over the pile table plane and can be lowered into or below said plane.

Preferably, the carrier member and support device are constructed, arranged and controlled in such a way that the pile is formed resting thereon and is brought into a removal position by the extension or lowering thereof. Unlike in the apparatus according to DAS No. 1,303,445, pile formation takes place on the carrier member, the support device supporting the pile in such a way that in the vicinity of the leading edge of the pile a space is left between the pile table and the carrier member below the same and through which the pile can be removed after lowering the support device and extending the carrier member.

Thus, pile formation always takes place under the same conditions and in the same position. Consequently, there is no possibility of the pile acquiring a subsequently visible step in the stocked profile, which could occur if it changed position during pile formation. In the apparatus according to the invention, position change only takes place at the end of pile formation. The removal of the pile from the pile table can be brought about by grippers or other random devices. It would also be possible to remove the pile by belt transfer or by slides, although the grippers are advantageous, because they ensure that the uppermost sheets of the pile are not held back by rubbing against the overlying sheets of the new pile. When reference is made here to a pile table, this is understood to mean any random construction of a support for the pile, i.e. for example also a belt section.

The support device preferably engages in ramp-like, upwardly tilting manner into the pile area. In particular, it can comprise preferably slightly curved for bent metal sheets or ledges, which pivot about a horizontal axis at their ends pointing counter to the sheet movement direction. Thus, they are narrow ledges or strips, which pass upwards through slots in the pile table and form a feed means for the sheets, so that the pile end does not have to run upwards in upwardly sloping manner too far and there is no possibility of the sheet sliding back. The question as to whether the upwardly moving pile is collected in upwardly sloping position and the manner of this slope, is dependent, inter alia, on the conveying speed. As a result of the upward movement, the sheets are automatically held back somewhat, so that their kinetic energy is reduced prior to striking the end stop of the pile.

Preferably, a plurality of carrier members rotatable in stepwise manner about a horizontal axis are provided, which can be substantially introduced into the pile area in the sheet movement direction. This leads to the formation of a wheel, which can advantageously be constructed as a thin disk, on which the carrier members are arranged in a substantially tangential manner.

Preferably, the carrier members have a substantially triangular shape, tapered counter to the sheet movement direction and which is preferably also chamfered in the transverse direction. In addition, the components following onto the carrier members and forming a stop for the leading edge of the sheets can be roughened or corrugated. These stops are the main stops, at which the leading edge of the pile forms. This corrugation or roughening prevents the sheets from rising up onto the stop and consequently causing the pile not to have a straight leading edge.

The rotation axis of the carrier members fitted substantially tangentially on the disks or turning stars can be positioned virtually vertically over the leading edge of the pile, so that the star does not prevent the removal of sheets from the carrier members, it being insured that the latter enters the pile in the sheet movement direction. Since the construction as a rotary wheel makes it possible to choose a very high indexing speed, no problems are caused in the entry into the pile of sheets moving in the same direction, because the speeds of the carrier member and sheet flow can be matched to one another. The last sheet or sheets of the finished pile may be taken up by the bottom of the new carrier member when it is swung in and are moved up against a stop provided for the leading edge of the pile, which is preferably pivotably mounted for lowering about an axis positioned below the pile table. This and the support device can be jointly lowered prior to the removal of the pile, so that the latter then rests on the pile table and can be removed in the sheet movement direction.

BRIEF DESCRIPTION OF THE DRAWINGS

The invention is described hereinafter relative to preferred and non-limiting embodiments. Individual features may be advantageous alone, but are particularly preferably used in reciprocal combination. With reference to the enclosed drawings.

DETAILED DESCRIPTION OF THE PREFERRED EMBODIMENTS

Figures 1, 2:
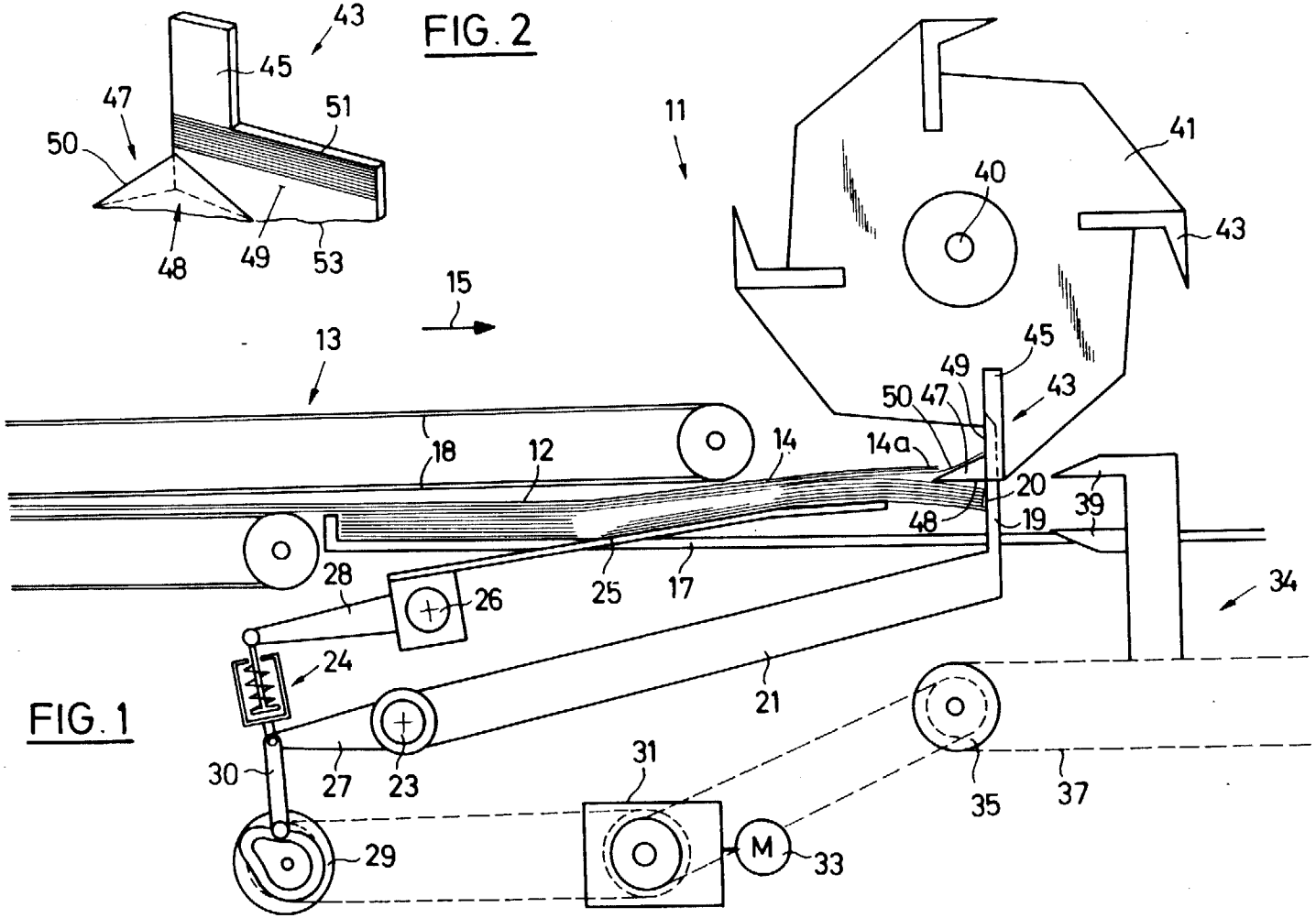
FIG. 1 is a diagrammatic view of an apparatus in a part sectional side view.
FIG. 2 is a perspective view of a carrier member removed from the turning star.

Apparatus 11 shown in the drawings forms the end or an intermediate station of a paper processing machine in which, for example, individual sheets 12 are cut from a paper roll and in certain circumstances can be conveyed in the sheet movement direction 15 in several rows and for several uses, in juxtaposed and in ragged or staggered superimposed form on a delivery conveyor 13.

A pile table 17, which in the present embodiment comprises a table plate with longitudinal slots, is positioned at the end of the conveyor 13 and is positioned below the conveying plane by an amount corresponding roughly to the height of the pile 14 to be formed. A conveyor belt 18, which simultaneously forms the upper belt of the delivery conveyor 13, extends up to shortly before the starwheel 41.

In the vicinity of the pile leading edge 20, is provided a vertical stop 19, projecting from below through the slots in pile table 17, which is fitted to a lever 21 and is pivotable about a horizontal axis 23. In the central area of the pile, a plurality of parallel support elements 25, formed from sheet metal strips, project through the slots in pile table 17. The free ends of the support elements, pointing towards the leading edge of the pile, are bent somewhat in the direction of the horizontal and project in ramp-like, upwardly inclined manner through table 17. Elements 25 are also pivotable about an axis 26 arranged just below table 17.

The pivoting of support elements 25 and lever 21 can be controlled mechanically or pneumatically in random manner. In the drawing, operation is by arms 27, 28, which are controlled by a cam 29, via a connection mechanism 30, in which is incorporated a spring mechanism 24, through which the support elements are mounted in cushioned manner. However, they can also be resiliently constructed by a self-cushioning construction.

Cam 29 is driven by a motor 33 via a gear 31 which, as required, also drives a sprocket 35 of a chain 37, which belongs to a removal device 34. Grippers 39 are fixed to chain 37 and can be controlled, opened and closed, by a not shown conventional device (not shown). The gripper can grip the leading edge 20 of pile 14 and draw it off in the sheet movement direction 15 on the extension of pile table 17.

A plurality of starwheels 41 are successively axially arranged so as to be rotatable in stepwise manner about an axis 40, which is positioned substantially vertically over the leading edge of the pile. The wheels comprise narrow disks and in the represented embodiment their outer circumference carries four carrier members 43.

The carrier members 43, shown in detail in FIG. 2, are fixed in each case by means of a fixing shoe 45 to starwheel 41 and following thereon have a substantially radially directed stop face 49 projecting on one side beyond the starwheel, which has horizontal corrugations 51 directed at right angles to the sheet movement direction and which could also be replaced by a roughened area or some other adhesive coating. A carrier finger 47 projects from stop face 49 and is shaped like a triangular spur with a substantially planar, lower surface and a both rearwardly (counter to the sheet movement direction) and laterally inclined upper surface. The portion of carrier member 43 forming stop face 49 has a lower limitation, which forms a chamfered sloping surface 53 at right angles to the sheet movement direction. The disk forming starwheel 41 is constructed in a somewhat sawtooth-like manner, a carrier member being received in such a way on the steep face of each sawtooth that the carrier finger 47 runs approximately tangentially with its outer face 48, while the upper edge 50 slopes outwards. Between the starwheel and each carrier finger an adequate gap is formed for receiving the pile thickness.

The described apparatus operates as follows. FIG. 1 represents the time at which a new pile 14a starts to form. Its leading edges meet upper edge 50 of carrier finger 47, which is positioned at the leading edge of the pile in such a way that stop face 49 defines the said leading edge. The sheets run onto the already formed pile 14, which is held in position by support elements 25, a plurality of which are transversely arranged (preferably two per stack), so that the actual pile forms a longitudinally curved ramp onto which are fed the sheets 12, supported by the upper edges 18, up to their engagement on a stop face 49, where the corrugations 51 prevent them from rising up onto the stop.

The leading edge of the already formed pile 14 is positioned below the outer or lower face 48 of the carrier member and the tips of the latter form a wedge, which clearly separates the two piles. Due to the triangular construction of carrier finger 47, the pile again assumes a curved configuration at right angles to the sheet movement direction, which can be desirable.

Figure 3:
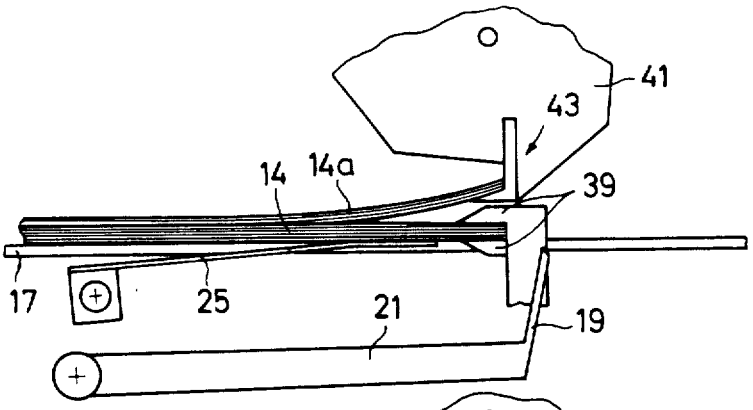
FIGS. 3 to 6 are partial views corresponding to FIG. 1 of different working positions of the apparatus.

When the conditions for starting the formation of the new pile 14a has been satisfied, synchronously and simultaneously, support elements 25 and stop 19 are lowered, so that they disappear beneath the pile table 17. This can be optionally brought about by different lengths of the lever arms 28 about different rotation angle amounts, which is controlled by cam 29. Simultaneously, removal device 34 is operated, in that gripper 39 is moved onto the leading edge of the pile and closes over it (FIG. 3). Pile 14 resting on pile table 17 is removed in the sheet movement direction 15 under the now newly forming pile 14a.

Figure 4:
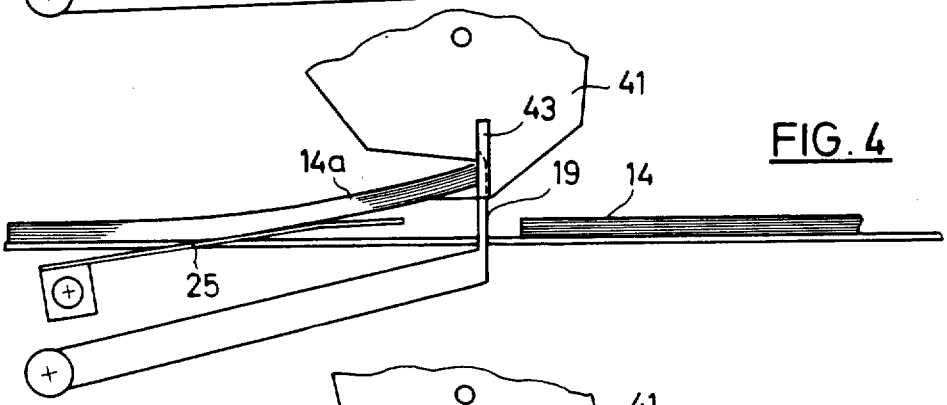

FIG. 4 shows that immediately after removing pile 14, stop 19 and support element 25 are swung up again, so that the support elements now form a runup ramp for the forming pile.

Figure 5:
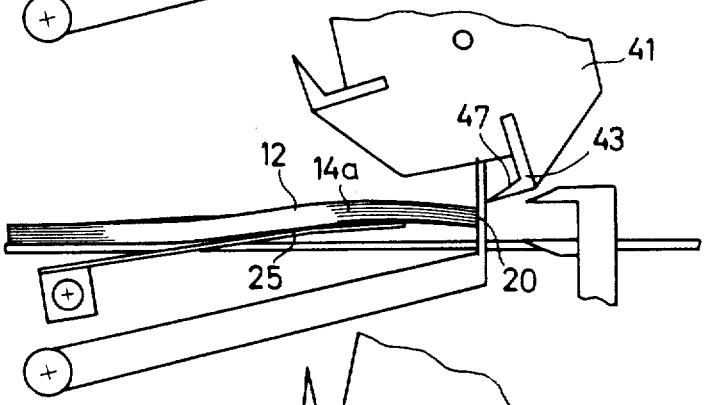

FIG. 5 shows the time at which the formation of pile 14a is ended. Starwheel 41 is rapidly rotated by one spacing i.e. by a quarter rotation in the represented embodiment, so that the leading edge 20 of the pile is no longer carried by the support elements 25, which terminate at a certain distance from the normal position of the tips of carrier finger 47. In this phase, stop 19 projecting up to starwheel 41 assumes the function of stop face 49.

Figure 6:
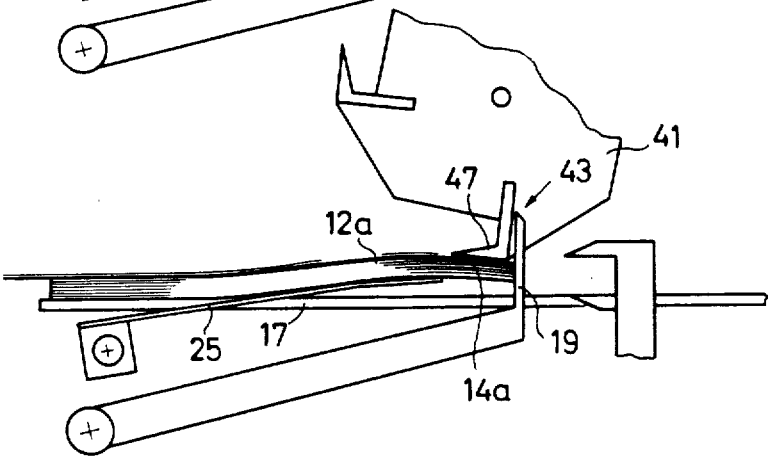

Normally, before the next sheet runs in, the new carrier finger is in position. FIG. 6 shows it shortly before this position and the sheet 12a can already run on to the carrier finger.

Thus, the position of FIG. 1 is reached again and the operational sequence can be repeated. The cushioned or self-sprung construction of the support elements 25 ensures that the lower face 48 of the carrier finger cannot jam the pile, before the support elements 25 are lowered. In all cases, lowering frees the pile from the carrier member, so that it is not drawn along the bottom of the carrier member on removal.

The apparatus ensures an interrupted pile formation and problem-free removal, accompanied by maximum quiet during operation and a wear-free construction of the apparatus. In addition, it is possible to reach production rates of several hundred piles per minute. The turning star makes it possible to remove the preceding carrier member and insert the new carrier member at high speed, so that there are no complications during the separation of the two piles.

What is claimed is:

1. An apparatus for sequentially forming and removing aligned piles of sheets formed from a stream of overlapping sheets transported to the apparatus in a flow direction, the apparatus comprising:

a pile removal device having removal means for removing each completed pile along a removal plane;

support means movable between a raised position over the removal plane for supporting at least a central portion of each forming pile and a lowered position at least as low as the removal plane;

carrier means for carrying the leading edge of each forming pile in a plane over each previously formed pile, during substantially all of pile formation, the carrier means having a carrier finger with an inclined surface;

stop [face] means operatively associated with the carrier means, disposed adjacent to the carrier finger and movable toward the carrier finger into a sheet engaging position in which the stop [face] means[, apart from the carrier means, enables] *maintains* aligned formation of the leading edge of each *completed* pile *prior to removal*; and, the stop [face] means and the carrier means being each movable into the sheet engaging position [in the sheet flow direction] from below and from above, respectively, during continuous sheet flow and being movable out of the sheet engaging position [in the sheet flow direction] one after another prior to removal of each [complete] *completed* pile.

2. An apparatus according to claim 1, wherein the support means projects upwardly to form a sloping ramp over the removal plane in the raised position.

3. An apparatus according to claim 1, wherein the support means comprises structure pivotable about a horizontal axis disposed at the upstream end of the support means.

4. An apparatus according to claim [1] *11*, further comprising a starwheel member mounted for stepwise rotation about a horizontal axis, a plurality of said carrier means *and stop face means* being spaced about the circumference of the starwheel member.

5. An apparatus according to claim 4, wherein the rotatable member is positioned almost directly above the leading edge of the forming piles and the carrier means are fitted substantially tangentially on the circumference of the rotatable member.

6. An apparatus according to claim 1, wherein the carrier means have a substantially triangular shape, tapered in a direction opposite to the sheet flow direction.

7. An apparatus according to claim 1, wherein the *carrier means comprises* carrier members, each [comprise] *carrier member having* a roughened surface forming a stop *face* for the leading edges of the conveyed sheets.

8. An apparatus according to claim 1, wherein the [support] *stop* means is mounted for pivotal movement about an axis positioned below the removal plane, enabling movement of the [support means and] stop ]face] means between an operative position above the removal plane and an inoperative position below the removal plane.

9. An apparatus according to claim 8, wherein the support means is mounted for downward movement together with the stop [member] *means*, prior to removal of each completed pile.

10. An apparatus according to claim 1, wherein the support means comprises spring means for resilient positioning means.

11. An apparatus according to claim 1, [wherein the] *further comprising* stop face means [comprises a member mounted for rotation about an axis positioned substantially directly above] *operatively associated with the carrier means, disposed adjacent to the carrier finger and movable together with the carrier finger into the sheet engaging position in which the stop face means enables aligned formation of* the leading edge of [the forming piles] *each pile during substantially all of the pile formation; and,*

*the stop face means and the carrier means being movable together into the sheet engaging position from above, during continuous sheet flow, and being movable out of the sheet engaging position in the sheet flow direction, prior to removal of each completed pile.*

12. An apparatus according to claim 11, wherein the [axis of the] *stop face means comprises a* rotatable member *having an axis which* is substantially horizontal and transverse to the feed flow direction.

13. An apparatus according to claim 11, wherein the pile removal device comprises a pile table in the removal plane, through which the support means is movable and on which completed piles are disposed prior to removal.

14. An apparatus according to claim 1, wherein the pile removal device comprises a pile table in the removal plane, through which the support means is movable and on which completed piles are disposed prior to removal.

15. An apparatus for sequentially forming and removing aligned piles of sheets formed from a stream of overlapping sheets transported to the apparatus in a flow direction, the apparatus comprising:

a pile removal device having removal means for removing each completed pile along a removal plane;

support means movable between a raised position over the removal plane for supporting at least a central portion of each forming pile and a lowered position at least as low as the removal plane;

carrier means for carrying the leading edge of each forming pile in a plane over each previously formed pile, during substantially all of pile formation, the carrier means having a carrier finger with an inclined surface[; the carrier means], *the finger* having a substantially triangular shape, tapered in a [direct] *direction* opposite to the sheet flow direction and chamfered in a direction transverse to the sheet flow direction;

stop [face] means operatively associated with the carrier means, disposed adjacent to the carrier finger and movable toward the carrier finger into a sheet engaging position in which the stop [face] means[, apart from the carrier means, enables] *maintains* aligned formation of the leading edge of each *completed* pile; and, the stop [face] means and the carrier means being each movable into the sheet engaging position [in the sheet flow direction] from below and from above, respectively, during continuous sheet flow and being movable out of the sheet engaging position in the sheet flow direction one after another prior to removal of each complete pile.

* * * * *